US012782051B2

(12) United States Patent
Lee et al.

(10) Patent No.: US 12,782,051 B2
(45) Date of Patent: Nov. 3, 2026

(54) DRYING APPARATUS FOR MANUFACTURING ELECTRODE AND METHOD FOR MANUFACTURING ELECTRODE USING SAME

(71) Applicant: LG Energy Solution, Ltd., Seoul (KR)

(72) Inventors: Doo Hyun Lee, Daejeon (KR); Jae Huoung Son, Daejeon (KR); Chang Bum Ahn, Daejeon (KR); Tae Yeon Kim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 868 days.

(21) Appl. No.: 18/027,668

(22) PCT Filed: Jul. 29, 2022

(86) PCT No.: PCT/KR2022/011173

§ 371 (c)(1),
(2) Date: Mar. 22, 2023

(87) PCT Pub. No.: WO2023/013984

PCT Pub. Date: Feb. 9, 2023

(65) Prior Publication Data

US 2023/0375269 A1 Nov. 23, 2023

(30) Foreign Application Priority Data

Aug. 5, 2021 (KR) ........................ 10-2021-0103377
Jul. 7, 2022 (KR) ........................ 10-2022-0083725

(51) Int. Cl.
*F16C 32/06* (2006.01)
*F16C 32/00* (2006.01)
(Continued)

(52) U.S. Cl.
CPC .......... *F26B 13/104* (2013.01); *F26B 13/002* (2013.01); *H01M 4/0404* (2013.01); *H01M 4/0471* (2013.01)

(58) Field of Classification Search
CPC ...... F26B 13/104; F26B 13/002; F26B 17/04; F26B 3/04; F21B 21/028; H01M 4/0404; H01M 4/0471; F16C 32/06; F16C 32/00
(Continued)

(56) References Cited

U.S. PATENT DOCUMENTS 5,246,155 A * 9/1993 Barrois ................... F16C 32/06
226/190
6,427,941 B1 * 8/2002 Hikita ..................... F26B 13/16
226/185
(Continued)

FOREIGN PATENT DOCUMENTS

CN 103779538 A * 5/2014 ........ H01M 10/0404
JP H10228898 A 8/1998
(Continued)

OTHER PUBLICATIONS

English CN103779538 by PE2E Dec. 5, 2025.*
(Continued)

*Primary Examiner* — Deming Wan
(74) *Attorney, Agent, or Firm* — Lerner David LLP

(57) ABSTRACT

A drying device for manufacturing an electrode comprises a dryer and a transfer part. The dryer is configured to dry a coated portion of an electrode base material when an electrode slurry is applied to the coated portion on at least one surface and not applied to an uncoated portion. The transfer part includes a floating part and a traveling part coupled to an outlet of the dryer. The floating part includes an air floating plate and is configured to float the electrode base material using air. The traveling part is configured to move
(Continued)

the electrode base material in a process direction. A method for manufacturing an electrode includes drying an electrode base material in which electrode slurry is applied on a least one surface of the electrode base material at a high temperature, and floating and transferring the electrode base material using air.

13 Claims, 6 Drawing Sheets

(51) Int. Cl.

| | |
|---|---|
| ***F26B 3/04*** | (2006.01) |
| ***F26B 13/00*** | (2006.01) |
| ***F26B 13/20*** | (2006.01) |
| ***F26B 15/18*** | (2006.01) |
| ***F26B 17/04*** | (2006.01) |
| ***F26B 21/02*** | (2006.01) |
| ***H01M 4/04*** | (2006.01) |

(58) Field of Classification Search
USPC .................................................... 34/523, 545
See application file for complete search history.

(56) References Cited

U.S. PATENT DOCUMENTS

| | | | |
|---|---|---|---|
| 2012/0103252 | A1 | 5/2012 | Watanabe |
| 2014/0014037 | A1 | 1/2014 | Watanabe et al. |

FOREIGN PATENT DOCUMENTS

| | | | |
|---|---|---|---|
| JP | 2003272612 | A | 9/2003 |
| JP | 2010225467 | A | 10/2010 |
| JP | 2011143388 | A | 7/2011 |
| JP | 4809699 | B2 | 11/2011 |
| JP | 2012209074 | A | 10/2012 |
| JP | 2014184364 | A | 10/2014 |
| JP | 2015219983 | A | 12/2015 |
| JP | 2018088327 | A | 6/2018 |
| JP | 2019145420 | A | 8/2019 |
| JP | 6586876 | B2 | 10/2019 |
| KR | 20050001084 | A | 1/2005 |
| KR | 100782220 | B1 | 12/2007 |
| KR | 20110019902 | A | 3/2011 |
| KR | 101181824 | B1 | 9/2012 |
| KR | 20140042661 | A | 4/2014 |
| KR | 101550864 | B1 | 9/2015 |
| KR | 20170094913 | A | 8/2017 |
| KR | 101810146 | B1 | 12/2017 |
| KR | 102017262 | B1 | 9/2019 |
| KR | 102170893 | B1 | 10/2020 |
| TW | 201039928 | A | 11/2010 |
| WO | 2011001648 | A1 | 1/2011 |

OTHER PUBLICATIONS

Kim, DH. et al., "Fine Gap Control Using Pneumatic Servo System", Journal of the Korean Society of Precision Engineering, Dec. 2002, vol. 19, No. 12, pp. 45-56, 13 pages. (English Translation of Abstract Only).

Narae Nanotech Co., Ltd, "Development of +8G super large size air floating coater", Ministry of Trade, Industry and Energy, Sep. 30, 2014, pp. 32. 209 pgs. (English Translation of Abstract Only).

International Search Report for PCT/KR2022/011173 mailed Nov. 11, 2022. 3 pages.

Extended European Search Report including Written Opinion for Application No. 22853362.6 dated Mar. 4, 2024, pp. 1-8.

* cited by examiner

[FIG. 1]
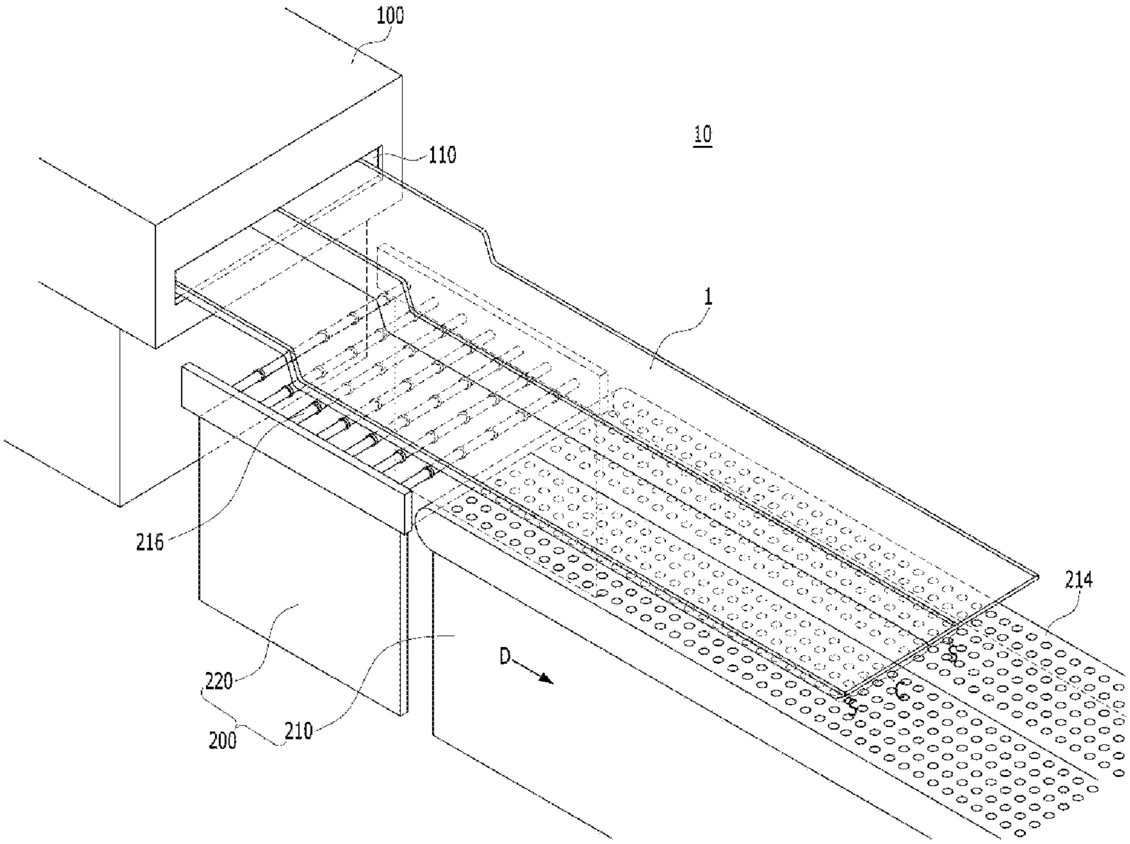

[FIG. 2]
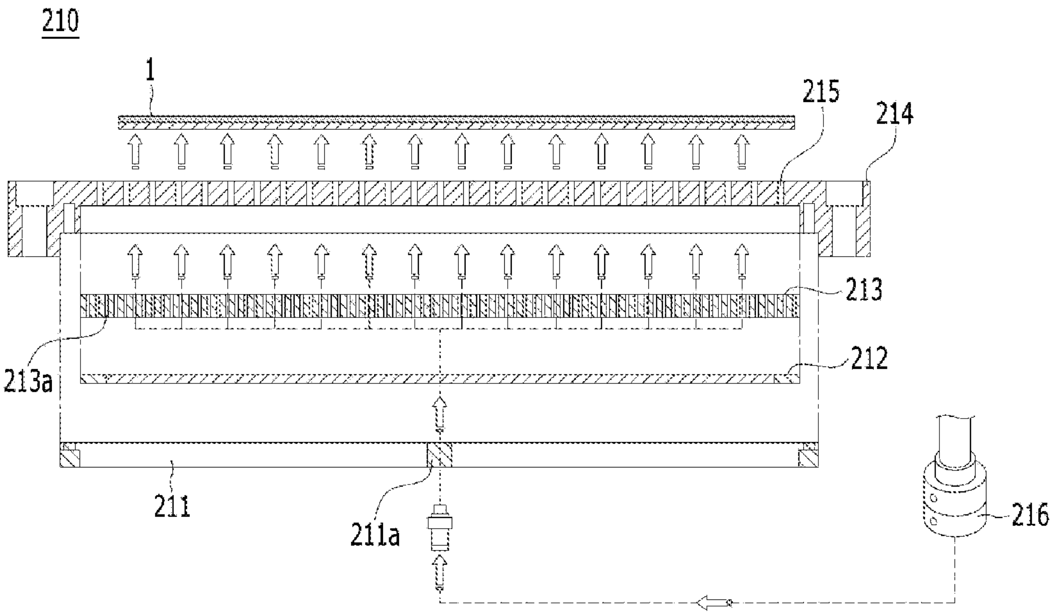
[FIG. 3]
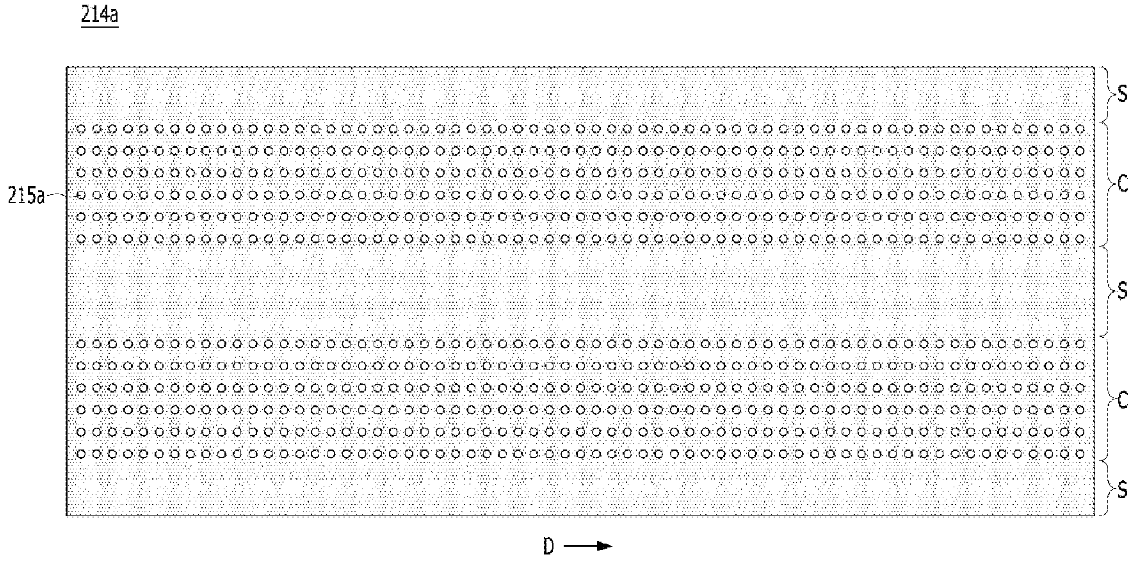

[FIG. 4]
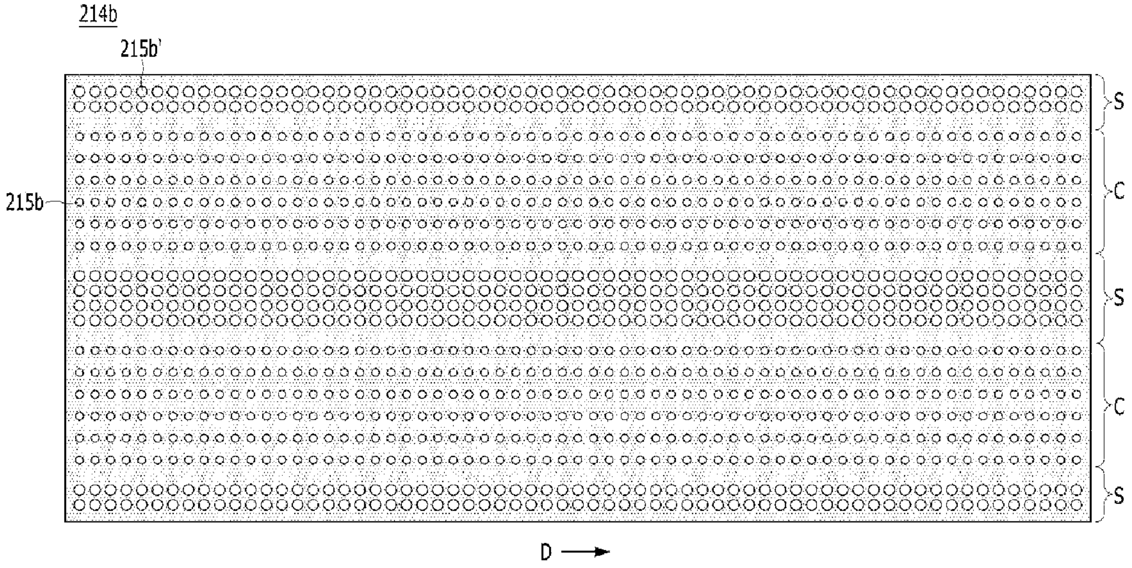
[FIG. 5]
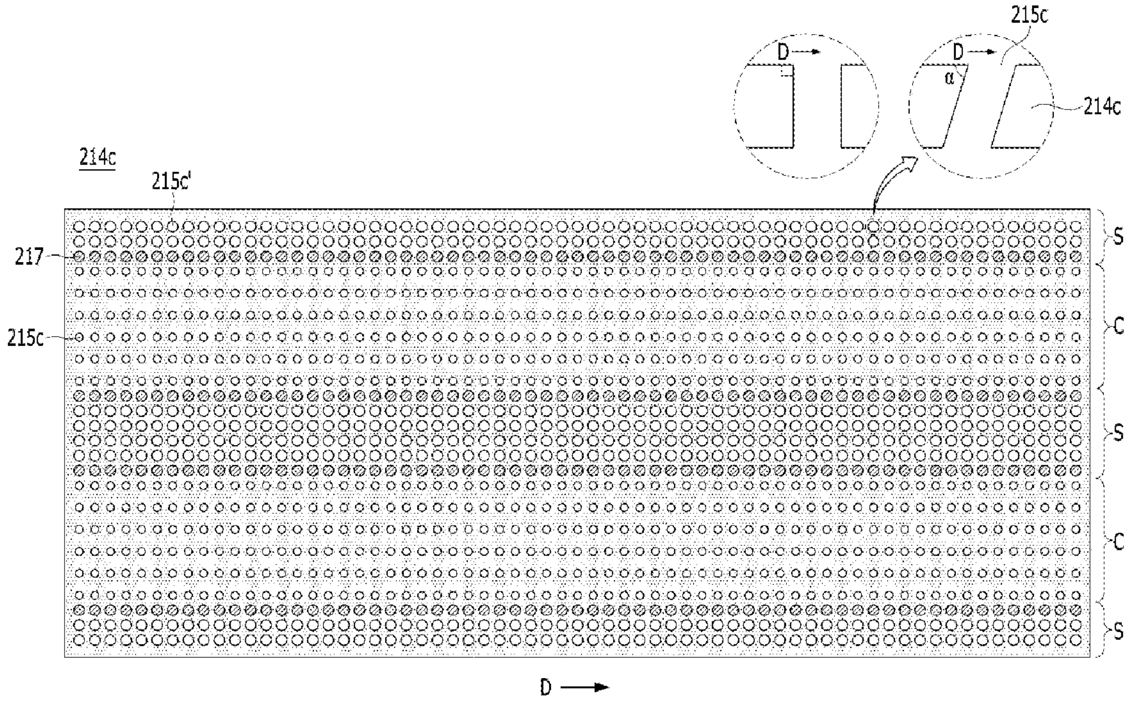

[FIG. 6]
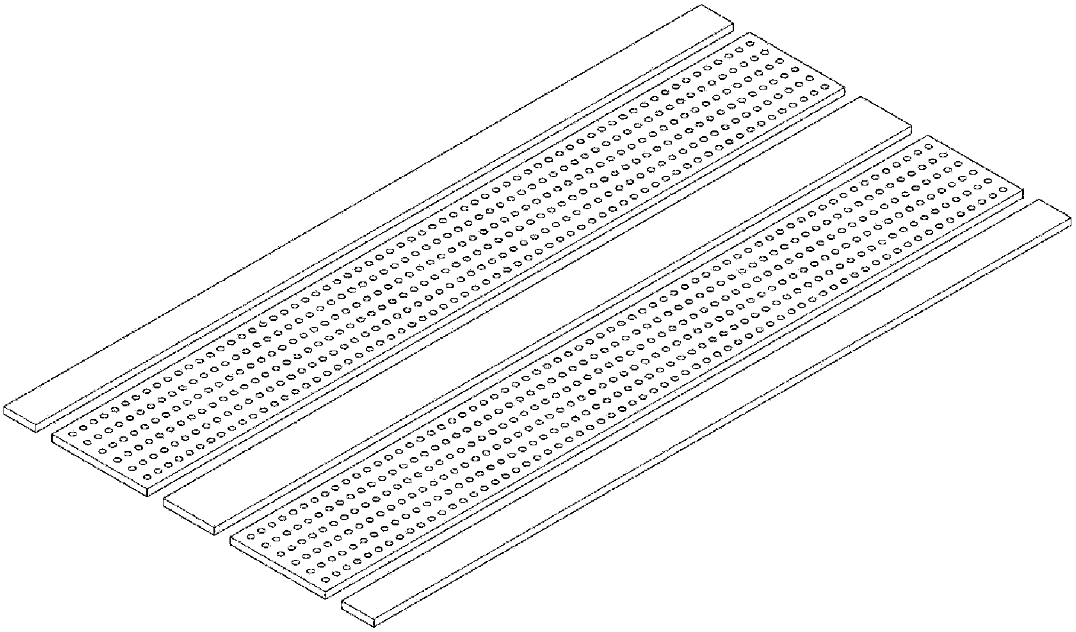

[FIG. 7]
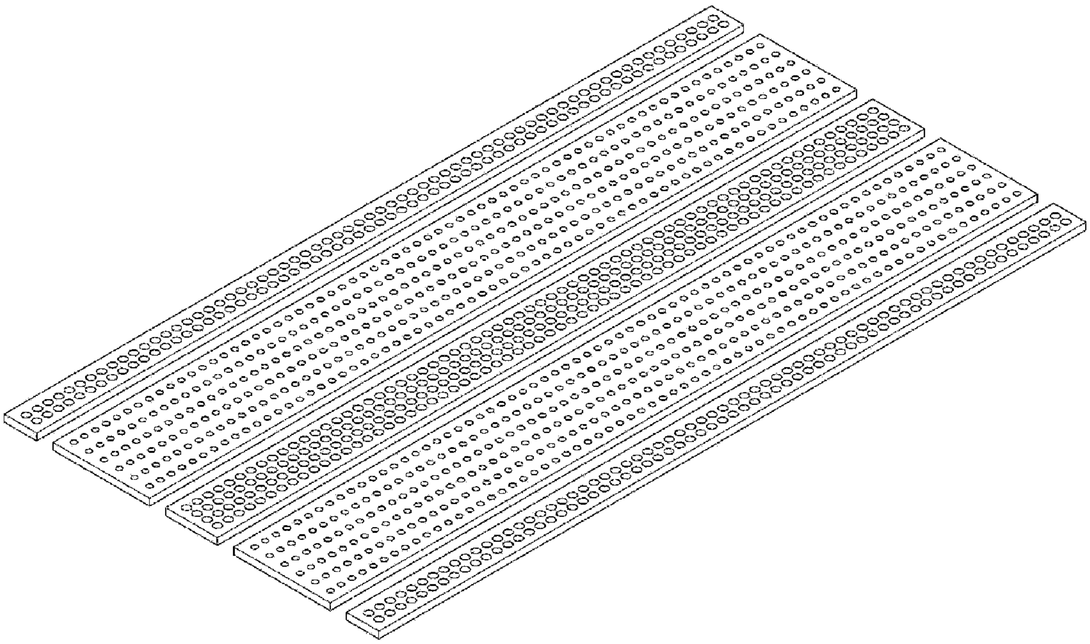

[FIG. 8]
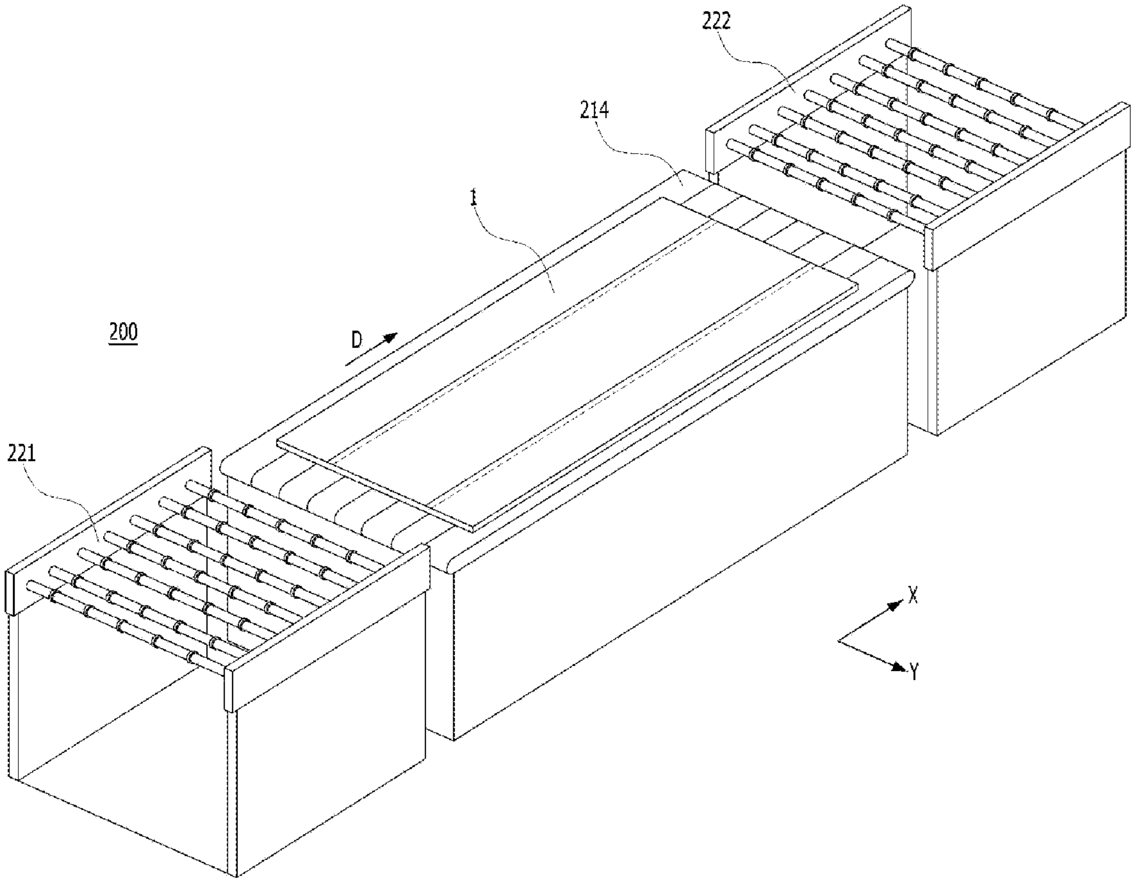

DRYING APPARATUS FOR MANUFACTURING ELECTRODE AND METHOD FOR MANUFACTURING ELECTRODE USING SAME

CROSS-REFERENCE TO RELATED APPLICATIONS

The present application is a national phase entry under 35 U.S.C. § 371 of International Application No. PCT/KR2022/011173 filed on Jul. 29, 2022, which claims priority from Korean Patent Applications Nos. 10-2021-0103377 filed on Aug. 5, 2021, and 10-2022-0083725 filed on Jul. 7, 2022, the disclosures of which are incorporated herein by reference.

TECHNICAL FIELD

The present disclosure relates to a drying device for manufacturing an electrode and a method of manufacturing an electrode using the same.

BACKGROUND ART

Lithium secondary batteries include electrodes that include active materials exhibiting electrical activity, and these electrodes are manufactured by applying an active material slurry on electrode base materials to form mixture layers and drying the mixture layers. A slurry coating device and a drying device are generally used when manufacturing the electrode. The drying device includes a dryer for drying a mixture layer of an electrode base material, and traveling rollers provided outside an outlet of the dryer and configured to move the dried electrode base material on which the mixture layer is dried.

Since the dryer removes a solvent in the slurry using high heat, the electrode base material exiting the outlet of the dryer has a thermal expansion deviation between a coated portion in which the mixture layer is formed and an uncoated portion in which the mixture layer is not formed. The thermal expansion deviation causes a problem in that the electrode base material is wrinkled or folded in a process direction in the uncoated portion while traveling. In order to solve the above problem, a cooling device for cooling the electrode base material is used or a coating/drying device to which a crease roller for smoothing wrinkles or folding is applied has been developed. However, the above devices require separate spaces for introducing a cooling device or a roller, and once the above devices are installed, it is difficult to change a specification such as a width of the electrode so that there is a problem in that processability is degraded. In addition, when an uncoated portion is formed between a plurality of coated portions, there may be a limitation in that an effect of improving wrinkles or folding formed in the uncoated portion is insignificant or the coated portion is damaged

DISCLOSURE

Technical Problem

An object of the present disclosure is to provide a drying device for manufacturing an electrode and a method of manufacturing an electrode using the same, which are capable of improving a thermal expansion deviation of an electrode base material which occurs between a coated portion and an uncoated portion, regardless of a shape or numbers of the coated portions to which an electrode slurry is applied and preventing wrinkles and/or a folding phenomenon, which are induced in the uncoated portion.

Technical Solution

In one embodiment of the present disclosure, there is provided a drying device for manufacturing an electrode, which includes a dryer and a transfer part. The dryer is configured to dry a coated portion of an electrode base material in which an electrode slurry is applied to the coated portion on at least one surface and is not applied to an uncoated portion. The transfer part includes a floating part and a traveling part coupled to an outlet of the dryer in which the floating part includes an air floating plate and is configured to float the electrode base material using air and the traveling part is configured to move the electrode base material in a process direction.

The air floating plate may include discharge ports configured to discharge air to a surface on which the electrode base material travels. The discharge ports may be included in the entirety of a surface of the air floating plate or included only in a region in which the coated portion of the electrode base material travels.

The discharge ports of the region in which the coated portion of the electrode base material travels may have an average diameter ranging from 0.005 mm to 10 mm.

When the discharge ports are included in the entirety of a surface of the air floating plate, in order to control a pressure of the air discharged in each region in which the coated portion and the uncoated portion of the electrode base material travel, a diameter and/or a frequency of the discharge port may be constantly controlled.

The discharge ports in a region in which the coated portion of the electrode base material travels may have an average diameter ranging from 50% to 99% of that of discharge ports in a region in which the uncoated portion of the electrode base material on which the electrode slurry is not applied travels.

The number of discharge ports per unit area of a region in which the coated portion of the electrode base material travels may range from 50% to 99% of the number of discharge ports per unit area of a region in which the uncoated portion of the electrode base material travels.

The discharge port may be provided to form an inclined angle of 30° to 80° with the surface of the air floating plate in a process direction of the electrode base material.

The air floating plate may include discharge ports configured to discharge air to the surface on which the electrode base material travels and vacuum suction holes configured to suction the discharged air at positions adjacent to the discharge ports.

The traveling part may include a tilting machine configured to tilt the air floating plates, or conveyors disposed at a front end and a rear end of the floating part and configured to slide the electrode base material in the process direction.

In another embodiment of the present disclosure, there is provided a method of manufacturing an electrode, which includes drying an electrode base material in which electrode slurry is applied on at least one surface of the electrode base material at a high temperature, and floating and transferring the electrode base material using air.

In the transferring of the electrode base material, the floating of the electrode base material may be performed by air discharged from discharge ports provided in an air floating plate.

A pressure of the air discharged from the discharge ports may range from 0.01 MPa to 0.5 MPa.

When the discharge ports are included in the entirety of a surface of the air floating plate, a pressure of the air discharged in a region in which a coated portion of the electrode base material travels may range from 0.05 MPa to 0.4 MPa, and a pressure of the air discharged in a region in which an uncoated portion of the electrode base material travels may range from 0.01 MPa to 0.2 MPa.

The air used in the transferring of the electrode base material may have a temperature ranging from −10° C. to 30° C.

The transferring of the electrode base material may be performed at a transfer speed ranging from 1 mm/s to 20 mm/s.

A drying device for manufacturing an electrode according to the present disclosure includes a floating part capable of floating and moving an electrode base material to a transfer part, which transfers the dried electrode base material, using air and cooling the electrode base material, thereby preventing wrinkles and/or a folding problem induced in the uncoated portion of the electrode base material. In addition, in the floating part, since an air floating plate in which the average diameter of discharge ports and/or the number of the discharge ports per unit area are controlled according to the specifications of an electrode to be manufactured can be replaced, there is an advantage of excellent processability.

BRIEF DESCRIPTION OF THE DRAWINGS

FIG. 1 is a schematic diagram illustrating a drying device for manufacturing an electrode according to the present disclosure.

FIG. 2 is a cross-sectional structural diagram illustrating a floating part of a transfer part provided in the drying device for manufacturing an electrode according to the present disclosure.

FIGS. 3 to 5 are diagrams illustrating one example which shows a surface structure of an air floating plate having a single plate-shaped structure according to the present disclosure.

FIGS. 6 to 7 are diagrams illustrating one example which shows a structure of an air floating plate having a structure in which a plurality of rod shapes are assembled according to the present disclosure.

FIG. 8 is a perspective view illustrating one example of a transfer part provided in the drying device for manufacturing an electrode according to the present disclosure.

DETAILED DESCRIPTION

The present disclosure may be modified into various forms and may have a variety of embodiments, and therefore, specific embodiments will be described in detail.

However, the embodiments are not to be taken in a sense which limits the present disclosure to the specific embodiments and should be construed to include all modifications, equivalents, or substituents falling within the spirit and technical scope of the present disclosure.

In the present disclosure, the terms "comprising," "having," and the like are used to specify the presence of a feature, a number, a step, an operation, a component, an element, or a combination thereof described herein, and they do not preclude the presence or addition of one or more other features, numbers, steps, operations, components, elements, or combinations thereof.

In addition, in the present disclosure, when a portion of a layer, a film, a region, a plate, or the like is described as being "on" another portion, this includes not only a case in which the portion is "directly on" another portion but also a case in which still another portion is present between the portion and other portion. Conversely, when a portion of a layer, a film, a region, a plate, or the like is described as being "under" another portion, this includes not only a case in which the portion is "directly under" another portion but also a case in which still another portion is present between the portion and other portion. In addition, in the present disclosure, being disposed "on" may include the case of being disposed not only on an upper portion but also on a lower portion.

In one embodiment of the present disclosure, there is provided a drying device for manufacturing an electrode, which includes a dryer configured to dry a coated portion of an electrode base material in which the coated portion to which an electrode slurry is applied is formed on at least one surface and an uncoated portion to which the electrode slurry is not applied, and a transfer part coupled to an outlet of the dryer and configured to move the dried electrode base material in a process direction, wherein the transfer part includes a floating part configured to float the electrode base material using air and provided with an air floating plate, and a traveling part configured to move the floated electrode base material in the process direction.

FIG. 1 is a perspective view illustrating the drying device for manufacturing an electrode according to the present disclosure. The drying device 10 for manufacturing an electrode according to the present disclosure includes a dryer 100 and a transfer part 200. Dryer 100 is configured to dry an applied electrode slurry after the electrode slurry for forming an electrode mixture layer is applied to the electrode base material. Transfer part 200 is configured to move the electrode base material 1 in a process direction D when the electrode base material 1 on which the applied electrode slurry is dried exits the dryer 100.

The dryer 100 may include a housing and a plurality of heating elements provided in the housing. An inlet (not shown) through which the electrode base material (or an electrode current collector 1), passes through a coater where an electrode slurry containing one or more electrode active materials is applied on a surface of the electrode base material. The inlet is provided on one side of the housing, and an outlet 110 through which the electrode base material (or the electrode current collector) exits is provided on the other side of the housing. The electrode base material 1 passing through an inside of the housing and discharged to the outside of the housing through the outlet travels along the transfer part 200 coupled to a rear side of the outlet 110 and is wound around an electrode recovery roller.

The plurality of heating elements generate heat due to supply of electric energy and are installed inside the housing. Specifically, the plurality of heating elements are disposed above the electrode base material 1 in the process direction D of the electrode base material 1. When the plurality of heating elements generate heat, due to radiant heat, the electrode slurry applied to an upper surface of the electrode base material, that is, the coated portion, is dried and cured. Specifically, the dry curing of the coated portion may be performed by heating the coated portion with the radiant heat of the heating elements to remove a solvent inside the electrode slurry. In the inside of the housing, an internal temperature of a space in which the plurality of heating elements are disposed may be controlled to a temperature capable of volatilizing the solvent, and specifically, may be controlled to a temperature ranging from 120° C. to 150° C. In addition, the heating element may be, for example, a halogen lamp. A heat reflecting plate for minimizing the loss of radiant heat implemented in the plurality of heating elements and surrounding an upper surface of each heating element to transmit the radiant heat to the electrode base material may be installed inside the housing.

In addition, the drying device 10 for manufacturing an electrode according to the present disclosure has a structure in which the transfer part 200 for moving the dried electrode base material 1 in the process direction D is continuously coupled to the outlet 110 of the dryer. The transfer part 200 includes a floating part 210 configured to float the electrode base material 1 using air and a traveling part 220 configured to move the floated electrode base material 1 in the process direction D.

The floating part 210 includes an air floating plate 214 which is installed perpendicular to the process direction D of the electrode base material and in which a plurality of discharge ports for blowing air to the surface of the electrode base material 1 are provided in the process direction D.

The air floating plate 214 may discharge air to the surface of the electrode base material 1 through the provided discharge ports, thereby floating the dried electrode base material 1 and preventing wrinkles and/or a folding phenomenon from occurring in the uncoated portion in which the electrode slurry is not applied.

Specifically, when the electrode base material 1 to which the electrode slurry is applied is dried at a high temperature, wrinkles and/or a folding phenomenon may occur in the uncoated portion due to a thermal expansion deviation between the coated portion to which the electrode slurry is applied and the uncoated portion to which the electrode slurry is not applied. In particular, in a surface contact transfer method, such as a roll-to-roll method, tension is generated in the process direction of the electrode base material 1. When the tension is applied to the electrode base material 1 having a high temperature by drying at a high temperature, wrinkles and/or a folding may strongly occur between the coated portion and the uncoated portion of the electrode base material 1. However, according to the present disclosure, air is discharged on the surface of the electrode base material 1 and dried at a high temperature so that cooling of the electrode base material may be promoted. In addition, along with the cooling of the electrode base material 1, the electrode base material 1 may be floated and moved. Thus, the tension applied to the electrode base material may be minimized so that it is possible to suppress the occurrence of wrinkles and/or folding between the coated portion to which the electrode slurry is applied and the uncoated portion to which the electrode slurry is not applied.

In addition, since the air floating plate 214 has a plate shape, it is possible to prevent the electrode base material from shaking due to distortion between rollers or bearings according to rotation occurring in an air floating system in a form in which a plurality of rollers or a plurality of bearings are combined. There is an advantage being able to minimize the generation of dust during the process and an advantage of safe equipment operation and easy maintenance.

In addition, a lower end of the air floating plate 214 is connected to an air supply part 216 for supplying air to a discharge port, and the air supply part 216 may include an air blower (not shown) for generating air. In this case, the air blower may include a motor for providing a driving force and an impeller which is rotated due to the driving of the motor, and in addition to the air blower, an air compressor and an air control unit for controlling a flow rate and a pressure of air may be further provided.

FIG. 2 is a schematic cross-sectional view illustrating a structure of the floating part 210. In the floating part 210, an air floating filter 213 is positioned between the air supply part 216 and the air floating plate 214 and may reduce a deviation of a supply amount of air discharged through a discharge port 215 of the air floating plate 214 and remove foreign materials in the air. The air floating filter 213 may have a mesh-sized mesh structure and include a micro channel structure in which an open pore portion guides and discharges air. In addition, in order to maintain insulation, the air floating filter 213 may be made of an insulating material. Specifically, the air floating filter 213 may employ a heat-resistant porous engineering plastic material or a porous ceramic material.

A gasket 212 may be further included between the air supply part 216 and the air floating filter 213 to prevent air from leaking to the outside, and in this way, it is possible to implement a pressure of the air supplied to the air floating plate 214 to be constantly maintained.

In addition, the air floating plate 214 is provided with the discharge port 215 for discharging air to a side surface on which the electrode base material 1 travels. The discharge port 215 may be formed on the entire surface of the air floating plate 214, that is, on the entire surface thereof or only in a region in which the coated portion of the electrode base material 1 travels.

FIGS. 3 to 5 are diagrams illustrating the surface of the air floating plate 214 according to the present disclosure. Air floating plates 214*a*, 214*b* and 214*c* include discharge ports 215*a* only in a region in which a coated portion C of the electrode base material travels as shown in FIG. 3 or include discharge ports 215*b*, 215*b*', 215*c*, and 215*c*' on the entire surfaces as shown in FIGS. 4 and 5.

As shown in FIG. 3, when the discharge ports 215*a* are included only in the region in which the coated portion C of the electrode base material travels, the air floating plate 214 may minimize the loss of air discharged to the surface of the electrode base material 1 to increase the flotation efficiency of the electrode base material 1. In addition, since the air floating plate 214 may induce rapid cooling of the coated portion, a temperature deviation between an electrode current collector and an active material layer (that is, the dried electrode slurry layer) which are positioned in the coated portion may be minimized to prevent the degradation of adhesive strength between the electrode current collector and the active material layer.

As shown in FIGS. 4 and 5, when the discharge ports 215*b*, 215*b*', 215*c*, and 215*c*' are included on the entirety of the surface of the electrode base material 1, the air floating plate 214 may minimize a cooling rate in a direction perpendicular to a direction in which the electrode base material 1 travels, that is, a deviation of the cooling rate in a width direction of the electrode base material 1 so that bending of the electrode base material 1 can be prevented from occurring.

In the air floating plate 214, when the discharge ports 215*b*, 215*b*', 215*c*, and 215*c*' are included in the entirety of the surfaces of the air floating plate 214*b* and 214*c*, an average diameter of a discharge port or the number of discharge ports per unit area in the region C, in which the coated portion of the electrode base material travels, may be smaller than those of a discharge port in a region S in which the uncoated portion of the electrode base material to which the electrode slurry is not applied travels.

As one example, when the air floating plates 214*b* and 214*c* include the discharge ports 215*a*, 215*b*, 215*b*', 215*c*, and 215*c*' on the entirety of the surfaces, the discharge port of the region C in which the coated portion of the electrode base material travels may have an average diameter ranging from 50% to 99% of that of the discharge port in the region S in which the uncoated portion of the electrode base material to which the electrode slurry is not applied travels. Specifically, each discharge port of the air floating plates 214*b* and 214*c* may have an average diameter ranging from 50% to 95%, from 50% to 90%, from 50% to 85%, from 50% to 80%, from 50% to 75%, from 50% to 70%, from 60% to 90%, from 70% to 95%, from 80% 99%, or from 75% to 90% of that of each discharge port of the region S in which the uncoated portion of the electrode base material travels.

The discharge port of the region C in which the coated portion of the electrode base material travels is not particularly limited as long as it has an average diameter suitable for discharging air sufficient to float the electrode base material including the coated portion. Specifically, the discharge port may have an average diameter ranging from 0.005 mm to 10 mm, and more specifically, may have an average diameter ranging from 0.005 mm to 5 mm, from 0.005 mm to 3 mm, from 0.005 mm to 2 mm, from 0.005 mm to 1 mm, from 0.005 mm to 0.9 mm, from 0.005 mm to 0.5 mm, from 0.005 mm to 0.1 mm, from 0.005 mm to 0.05 mm, from 0.005 mm to 0.01 mm, from 0.01 mm to 0.03 mm, from 0.025 mm to 0.05 mm, from 0.06 mm to 0.09 mm, from 0.01 mm to 3 mm, from 0.05 mm to 2 mm, from 0.05 mm to 1 mm, from 0.1 mm to 1 mm, from 0.5 mm to 2 mm, from 0.5 mm to 0.9 mm, or from 0.01 mm to 0.1 mm.

As another example, when the air floating plates 214*b* and 214*c* include the discharge ports 215*b*, 215*b*', 215*c*, and 215*c*' on the entirety of the surfaces, the number of discharge ports per unit area of the region C in which the coated portion of the electrode base material travels may range from 50% to 99% of the number of discharge ports per unit area of the region S in which the uncoated portion of the electrode base material travels, and specifically, may range from 50% to 90%, from 60% to 90%, from 70% to 90%, from 60% to 80%, from 50% to 70%, or from 65% to 85% of the number of discharge ports per unit area of the region S in which the uncoated portion of the electrode base material travels.

According to the present disclosure, the average diameter and the number per unit area according to the positions of the discharge ports 215*b*, 215*b*', 215*c*, and 215*c*' introduced into the air floating plates 214*b* and 214*c* are controlled in the above ranges, and thus the electrode base material 1 on which the electrode slurry is applied may be stably floated. The uncoated portion in which the electrode slurry is not applied may be heated to a high temperature and then rapidly cooled to a temperature lower than room temperature to rapidly cure a base material of the uncoated portion. In this way, it is possible to improve a thermal expansion deviation of the electrode base material 1.

In addition, the discharge ports 215*a*, 215*b*, 215*b*', 215*c*, and 215*c*' introduced into the surface of the air floating plate 214*a*, 214*b*, and 214*c* may each have a porosity (aperture ratio) ranging from 20% to 80%, and specifically, from 30% to 70%. According to the present disclosure, the porosity (aperture ratio) of each discharge port introduced into the air floating plates 214*a*, 214*b* and 214*c* is controlled within the above range so that a flow of air discharged to the surfaces of the air floating plates 214*a*, 214*b*, and 214*c* may be smooth and an inflow of fine particles present in the air may be blocked.

The discharge ports 215*a*, 215*b*, 215*b*', 215*c*, and 215*c*' of the air floating plate applied to the present disclosure may be formed perpendicular to the direction D in which the electrode base material 1 travels, or as shown in FIG. 5, or may be provided to form an inclined angle α ranging from 30° to 80° with the surfaces of the air floating plates 214*a*, 214*b*, and 214*c* in the process direction D in which the electrode base material 1 travels. Specifically, the discharge ports 215*a*, 215*b*, 215*b*', 215*c*, and 215*c*' may be formed perpendicular to the direction D in which the electrode base material 1 travels or may be provided to form an inclined angle α, with the surfaces of the air floating plates 214*a*, 214*b*, and 214*c*, ranging from 30° to 70°, from 30° to 60°, from 30° to 50°, from 45° to 70°, from 60° to 80°, from 30° to 45°, or from 40° to 60°.

According to the present disclosure, by controlling the angles of the discharge ports 215*a*, 215*b*, 215*b*', 215*c*, and 215*c*' to satisfy the above range, the electrode base material may be moved with little energy due to the discharged air.

The air floating plates 214*a*, 214*b*, and 214*c* include the discharge ports 215*a*, 215*b*, 215*b*', 215*c*, and 215*c*' for discharging the air to the surface on which the electrode base material travels and may include vacuum suction holes 217 for suctioning the air, which is discharged through the discharge ports 215*a*, 215*b*, 215*b*', 215*c*, and 215*c*', again at positions adjacent to the discharge ports 215*a*, 215*b*, 215*b*', 215*c*, and 215*c*'.

The air floating plates 214*a*, 214*b* and 214*c* are not particularly limited as long as they are positioned adjacent to the discharge ports provided on the surfaces and may include the vacuum suction holes 217 for suctioning the discharged air again. Specifically, as shown in FIG. 5, the vacuum suction holes 217 may be provided between the region C in which the coated portion of the electrode base material 1 travels and the region S in which the uncoated portion of the electrode base material travels or a column of discharge ports and a column of vacuum suction holes 217 may be alternately provided in the direction D in which the electrode base material 1 travels.

The vacuum suction holes 217 are for stably transporting the dried electrode base material 1 and may be disposed at positions adjacent to the discharge ports 215*a*, 215*b*, 215*b*', 215*c*, and 215*c*' to facilitate air exhaust. In this way, a bending phenomenon of the electrode base material 1 may be minimized and it is possible to easily control fluctuations, floating flatness, and a height.

In the floating part 210, since the air floating plates 214*a*, 214*b*, and 214*c* may be separated and replaced, an air floating plate in which an average diameter and the number of discharge ports are controlled according to the specifications of the electrode to be manufactured may be applied.

As shown in FIGS. 3 to 5, the air floating plates 214*a*, 214*b*, and 214*c* may each have a structure in which discharge ports having an average diameter, the number per unit area, and/or porosity controlled according to the coated portion and the uncoated portion of the electrode base material 1 are provided on one plate-shaped base material.

Alternatively, as shown in FIGS. 6 and 7, the air floating plates 214*a*, 214*b*, and 214*c* may each have a structure in which a plurality of rod-shaped base materials may be assembled according to positions of the coated portion and the uncoated portion of the electrode base material 1. In this case, processability and assemblability of the air floating plate are high so that there is an advantage in that the degree of freedom and responsiveness in terms of a design of the electrode base material is improved.

Meanwhile, the transfer part 200 includes a traveling part 220 as a part for moving the electrode base material 1 floated by the floating part 210. The traveling part 220 is not particularly limited as long as it can move the floated electrode base material 1, and specifically, may include a tilting machine for tilting and erecting the air floating plates 214*a*, 214*b*, 214*c* and a conveyor disposed at a front end and a rear end of the floating part 210 and configured to slide the electrode base material 1 in the process direction D.

The tilting machine is a device for tilting the air floating plates 214*a*, 214*b* and 214*c* to be inclined so that the floated electrode base material 1 is moved in an inclined direction. A tilting frame is positioned on one side opposite to the surface on which the electrode base material 1 of each of the air floating plates 214*a*, 214*b*, and 214*c* travels so that the air floating plates 214*a*, 214*b* and 214*c* may be erected to be inclined.

The tilting machine is a device for applying an external force so that the electrode base material 1 floated by each of the air floating plates 214*a*, 214*b*, 214*c* is moved at an appropriate speed due to gravity and an inclined angle, and the inclined angle implemented by the tilting machine may range from 1° to 20°, and more specifically, from 1° to 15°, from 1° to 10°, from 5° to 15°, from 8° to 12°, or from 3° to 8°.

In addition, the conveyor may be disposed at each of the front end and the rear end of the floating part 210 to move the electrode base material 1. In this case, the conveyor may include one or more of a belt type conveyor and/or a roller type conveyor.

FIG. 8 is a perspective view illustrating a case in which the transfer part 200 is provided with a conveyor as the traveling part 220. The conveyor may include a first conveyor 221 positioned at the front end of the floating part 210 and a second conveyor 222 positioned at the rear end of the floating part. The first conveyor 221 and the second conveyor 222 may be formed to be coplanar with the air floating plate 214 of the floating part 210 to prevent jamming from occurring while the electrode base material 1 is moved.

The transfer part 200 may further include an unwinder (not shown) for supplying the electrode base material 1 to the dryer 100 and a winder (not shown) for winding the electrode base material having passed through the dryer. The unwinder may supply the electrode base material 1 to the dryer, thereby applying a pushing force to the electrode base material 1 and moving the electrode base material 1 in the process direction D, and the winder may apply a pulling force to the dried electrode base material 1 in the process direction D, thereby moving the dried electrode base material 1. The unwinder may be located at a front end of the dryer 100, and the winder may be located at a rear end of the floating part 210.

Since the drying device 10 for manufacturing an electrode according to the present disclosure includes the above-described components, it is possible to improve the thermal expansion deviation of the electrode base material 1 dried at high temperature so that wrinkles and/or a folding problem induced in the uncoated portion of the electrode base material may be prevented. In the floating part 210, the air floating plate 214 in which the average diameter of the discharge ports 215 and/or the number of discharge ports 215 per unit area are controlled according to the specifications of the electrode to be manufactured may be replaced so that there is an advantage of excellent processability.

In one embodiment of the present disclosure, there is provided a method of manufacturing an electrode, which includes drying an electrode base material in which an electrode slurry is applied on at least one surface of the electrode base material at a high temperature, and floating and transferring the high-temperature dried electrode base material using air.

The method of manufacturing an electrode according to the present disclosure may include applying the electrode slurry on at least one surface of the electrode base material to form an electrode mixture layer, drying the electrode base material, on which the electrode slurry is applied at a high temperature, and floating and transferring the dried electrode base material using air. This method may be performed using the above-described drying device for manufacturing an electrode of the present disclosure.

Specifically, in the drying of the electrode base material, when the electrode base material (or electrode current collector) which has passed through the coater and on which the electrode slurry containing one or more electrode active materials is applied to the surface is introduced into the dryer of the drying device, a solvent in the electrode slurry applied to the electrode base material may be removed by a plurality of heating elements provided in the dryer. Thus, the applied electrode slurry may be cured to form an electrode mixture layer. In this case, a temperature in the dryer due to radiant heat of the heating elements may be specifically controlled in the range of 120° C. to 150° C.

In addition, the transferring of the dried electrode base material may be performed by the transfer parts continuously coupled to the outlet of the dryer. Specifically, when the dried electrode base material exits through the outlet of the dryer, the dried electrode base material enters the transfer part coupled to the outlet. The entering electrode base material is floated by the air floating plate of the transfer part and is moved in the process direction in a state of being floated. The air floating plate includes the discharge ports for discharging air to the surface of the electrode base material in a direction in which the electrode base material travels, and the air discharged through the discharge ports may float the dried electrode base material and may satisfy a predetermined range of a pressure and/or a temperature so as to improve wrinkles and/or a folding phenomenon occurring in the uncoated portion of the electrode base material due to the electrode slurry heated to a high temperature.

Specifically, the pressure of the air discharged through the discharge ports may be controlled in the range of 0.01 MPa to 0.5 MPa, and more specifically, in the range of 0.01 MPa to 0.4 MPa, 0.01 MPa to 0.3 MPa, 0.01 MPa to 0.2 MPa, 0.01 MPa to 0.1 MPa, 0.05 MPa to 0.2 MPa, 0.1 MPa to 0.5 MPa, 0.2 MPa to 0.4 MPa, 0.01 MPa to 0.09 MPa, or 0.05 MPa to 0.09 MPa.

As one example, when the discharge ports are included in the entirety of the surface of the air floating plate, the pressure of the air discharged from the region in which the coated portion of the electrode base material travels may range from 0.05 MPa to 0.4 MPa or from 0.1 MPa to 0.15 MPa, and the pressure of the air discharged from the region in which the uncoated portion of the electrode base material travels may range from 0.01 MPa to 0.2 MPa or 0.04 MPa to 0.07 MPa.

In addition, the temperature of the air discharged through the discharge ports may be controlled in the range of −10° C. to 30° C., and specifically, in the range of −10° C. to 20° C., −10° C. to 10° C., −10° C. to 5° C., 0° C. to 30° C., 5° C. to 20° C., or 10° C. to 20° C.

As one example, when the discharge ports are included in the entirety of the surface of the air floating plate, the temperature of the air discharged from the region in which the coated portion of the electrode base material travels may range from 10° C. to 20° C., and the temperature of the air discharged from the region in which the uncoated portion of the electrode base material travels may range from −5° C. to 5° C.

According to the present disclosure, by controlling the pressure and the temperature of the air discharged from the discharge ports of the air floating plate in the above-described ranges, the dried electrode base material may be stably floated, and the uncoated portion of the electrode base material, in which the high-temperature electrode slurry is not applied, is rapidly cured so that thermal expansion deviation between the coated portion and the uncoated portion may be reduced.

In addition, in the transferring of the dried electrode base material, a transfer speed of the electrode base material may be appropriately controlled to stably move the electrode base material in the state of being floated. To this end, the transfer speed of the electrode base material may be controlled in the range of 1 mm/s to 20 mm/s, and specifically in the range of 5 mm/s to 15 mm/s, or 8 mm/s to 12 mm/s.

Since the method of manufacturing an electrode according to the present disclosure includes the above-described components, it is possible to improve the thermal expansion deviation of the electrode base material dried at a high temperature so that wrinkles and/or a folding problem induced in the uncoated portion of the electrode base material may be prevented.

Hereinafter, the present disclosure will be described in more detail with reference to examples and experimental examples.

However, the following examples and experimental examples are merely illustrative of the present disclosure, and the content of the present disclosure is not limited to the following examples and experimental examples.

In order to evaluate the performance of the drying device for manufacturing an electrode according to the present disclosure, the following experiment was performed.

Specifically, a steel plate having a length of 1500 cm, a width of 600 cm, and a thickness of 0.6 cm was prepared. Discharge ports having an average diameter and the number per unit area as shown in Table 1 were formed on a surface of the steel plate to manufacture an air floating plate.

Then, separately, a first conveyor in the form of a roller, a floating part, and a second conveyor in the form of a roller were coupled to the outlet of the dryer having an internal temperature of about 130° C. by a halogen lamp. The air floating plate produced in advance was mounted on a front portion of the floating part to prepare the drying device for manufacturing an electrode. As shown in FIG. 2, the floating part has a structure in which the gasket 212, the air floating filter 213, and the air floating plate 214 are sequentially stacked on the lower table 211 provided with an air supply hole 211*a*. An air supply part 216 is coupled to the air supply hole 211*a* of the lower table 211 so that the floating part has a structure in which air is supplied to the air floating plate 214.

TABLE 1

| | Traveling region in which coated portion of electrode base material travels | | | Traveling region in which uncoated portion of electrode base material travels | | |
|---|---|---|---|---|---|---|
| | Average diameter of discharge ports [mm] | Number of discharge ports per unit area (10 cm × 10 cm) | Air pressure [MPa] | Average diameter of discharge ports [mm] | Number of discharge ports per unit area (10 cm × 10 cm) | Air pressure [MPa] |
| Example 1 | 1 | 25 | 0.2 | 0 | 0 | 0 |
| Example 2 | 0.05 | 25 | 0.2 | 0.0625 | 30 | 0.3 |
| Example 3 | 1 | 25 | 0.2 | 1.25 | 30 | 0.3 |
| Example 4 | 0 | 0 | 0 | 1.25 | 30 | 0.3 |
| Example 5 | 0.001 | 25 | 0.2 | 0.00125 | 30 | 0.3 |
| Example 6 | 15 | 25 | 0.2 | 18.75 | 30 | 0.3 |
| Example 7 | 1 | 25 | 0.2 | 0.4 | 30 | 0.3 |
| Example 8 | 1 | 25 | 0.2 | 1 | 30 | 0.3 |
| Example 9 | 1 | 25 | 0.2 | 1.25 | 10 | 0.3 |
| Example 10 | 1 | 25 | 0.2 | 1.25 | 40 | 0.3 |
| Example 11 | 1 | 25 | 0.01 | 1.25 | 30 | 0.015 |
| Example 12 | 1 | 25 | 1 | 1.25 | 30 | 1.5 |
| Comparative Example 1 | 0 | 0 | 0 | 0 | 0 | 0 |

The electrode base material on which the electrode slurry was applied was dried and transferred (with a transfer speed of about 11 mm/s) using the prepared drying device for manufacturing an electrode. The temperature of the air discharged from the air floating plate was controlled to a temperature of 20° C. in the region in which the coated portion of the electrode base material traveled and was controlled to a temperature of 10° C. in the region in which the uncoated portion of the electrode base material traveled. In addition, a degree of floating of each electrode and whether wrinkles and/or folding occurred in the uncoated portion of the electrode base material were checked. The evaluation criteria are as follows, and the results are shown in Table 2 below.

① Evaluation whether electrode base material was floated:
- ○: The electrode base material was stably floated
- Δ: The electrode base material was floated but it is not suitable for the process due to severe shaking.
- x: The electrode base material was not floated at all.

② Whether wrinkles/folding occurred in the uncoated portion of the electrode base material
- ○: An area where wrinkles/folding occurred in the uncoated portion area was less than 5% of the total area.
- Δ: An area where the wrinkles/folding occurred in the uncoated portion area was 5% or more and less than 50% of the total area.

x: An area where wrinkles/folding occur in the uncoated portion area was 50% or more of the total area.

TABLE 2

| | ① Whether electrode base material was floated | Whether wrinkles/ folding occurred in the uncoated portion |
|---|---|---|
| Example 1 | ○ | x |
| Example 2 | ○ | x |
| Example 3 | ○ | x |
| Example 4 | x | Δ |
| Example 5 | x | ○ |
| Example 6 | Δ | Δ |
| Example 7 | Δ | x |
| Example 8 | Δ | Δ |
| Example 9 | x | ○ |
| Example 10 | Δ | x |
| Example 11 | x | ○ |
| Example 12 | Δ | x |
| Comparative Example 1 | x | ○ |

As shown in Table 2 above, the drying device for manufacturing an electrode according to the present disclosure may float the electrode base material dried at a high temperature to safely move the electrode base material using air and reduce the thermal expansion deviation between the coated portion and the uncoated portion of the electrode base material due to the high temperature drying so that it can be seen that an effect of improving wrinkles and/or a folding phenomenon of the uncoated portion is excellent.

From the above results, the drying device for manufacturing an electrode according to the present disclosure can dry the electrode base material on which the electrode slurry is applied at a high temperature and then float and move the electrode base material and can prevent wrinkles and/or a folding phenomenon due to the thermal expansion deviation between the coated portion and the uncoated portion of the electrode base material without damage to the coated portion so that it can be seen that processability is excellent.

Although the above description has been made with reference to exemplary embodiments of the present disclosure, it should be understood that various alterations and modifications of the present disclosure can be devised by those skilled in the art to which the present disclosure pertains without departing from the spirit and scope of the present disclosure, which are defined by the appended claims.

Therefore, the technical scope of the present disclosure should not be limited to the contents described in the detailed description of this specification but should be determined by the scope of the appended claims.

DESCRIPTION OF REFERENCE NUMERALS

1: electrode base material
10: drying device for manufacturing an electrode
100: dryer
110: dryer outlet
200: transfer part
210: floating part
211: lower table
211*a*: air supply hole
212: gasket
213: air floating filter
213*a*: fine hole
214, 214*a*, 214*b*, and 214*c*: air floating plates
215, 215*a*, 215*b*, 215*b*', and 215*c*: discharge ports of air floating plates
216: air supply part
217: air suction hole
220: traveling part
221: first conveyor
222: second conveyor
D: process direction of electrode
S: traveling region in which coated portion of electrode base material travels
C: traveling region in which uncoated portion of electrode base material travels

The invention claimed is:

1. A drying device for manufacturing an electrode, comprising:
a dryer configured to dry a coated portion of an electrode base material, wherein an electrode slurry is applied to the coated portion on at least one surface and is not applied to an uncoated portion; and
a transfer part including a floating part and a traveling part coupled to an outlet of the dryer,
wherein the floating part includes an air floating plate and is configured to float the electrode base material using air and the traveling part is configured to move the electrode base material in a process direction, and
wherein the air floating plate includes discharge ports configured to discharge air to a surface of the air floating plate on which the electrode base material travels, and vacuum suction holes configured to suction the discharged air at positions adjacent to the discharge ports.

2. The drying device of claim 1, wherein, the discharge ports are included in the entirety of the surface of the air floating plate, and a first plurality of discharge ports in a first region in which the coated portion of the electrode base material travels have an average diameter ranging from 50% to 99% of that of a second plurality of discharge ports in a second region in which the uncoated portion of the electrode base material on which the electrode slurry is not applied travels.

3. The drying device of claim 1, wherein a first plurality of the discharge ports of a first region in which the coated portion of the electrode base material travels have an average diameter ranging from 0.005 mm to 10 mm.

4. The drying device of claim 1, wherein, the discharge ports are included in the entirety of the surface of the air floating plate, and a number of a first plurality of discharge ports per unit area of a first region in which the coated portion of the electrode base material travels ranges from 50% to 99% of a number of a second plurality of discharge ports per unit area of a region in which the uncoated portion of the electrode base material travels.

5. The drying device of claim 1, wherein each discharge port of the discharge ports forms an inclined angle of 30° to 80° with a respective portion of the surface of the air floating plate in which each discharge port discharges air in the process direction of the electrode base material.

6. The drying device of claim 1, wherein the traveling part is configured to tilt the air floating plate.

7. A method of manufacturing an electrode using the drying device of claim 1, comprising:
drying an electrode base material in the dryer at a high temperature, in which electrode slurry is applied on at least one surface of the electrode base material; and
floating and transferring the electrode base material via the transfer part using air.

8. The method of claim 7, wherein the floating of the electrode base material is performed by air discharged from the discharge ports of the air floating plate.

9. The method of claim 8, wherein a pressure of the air discharged from the discharge ports ranges from 0.01 MPa to 0.5 MPa.

10. The method of claim 9, wherein, the discharge ports are included in the entirety of a surface of the air floating plate, a pressure of the air discharged in a first region in which a coated portion of the electrode base material travels ranges from 0.05 MPa to 0.4 MPa, and a pressure of the air discharged in a second region in which an uncoated portion of the electrode base material travels ranges from 0.01 MPa to 0.2 MPa.

11. The method of claim 7, wherein the air used in the transferring of the electrode base material has a temperature ranging from −10° C. to 30° C.

12. The method of claim 7, wherein the transferring of the electrode base material is performed at a transfer speed ranging from 1 mm/s to 20 mm/s.

13. The drying device of claim 1, wherein the traveling part includes conveyors disposed at a front end and a rear end of the floating part, the conveyors being configured to slide the electrode base material in the process direction.

* * * * *